(12) United States Patent
Seo et al.

(10) Patent No.: US 8,154,514 B2
(45) Date of Patent: Apr. 10, 2012

(54) METHOD OF CONTROLLING MOVEMENT OF GRAPHICS OBJECT AND REMOTE CONTROL DEVICE USING THE SAME

(75) Inventors: Jang-seok Seo, Seoul (KR); Il-woo Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1218 days.

(21) Appl. No.: 11/700,825

(22) Filed: Feb. 1, 2007

(65) Prior Publication Data

US 2007/0208528 A1 Sep. 6, 2007

(30) Foreign Application Priority Data

Mar. 2, 2006 (KR) .................. 10-2006-0020011

(51) Int. Cl.
*G06F 3/033* (2006.01)
(52) U.S. Cl. ........................................... 345/158
(58) Field of Classification Search ............. 345/158
See application file for complete search history.

(56) References Cited

U.S. PATENT DOCUMENTS

| | | | | |
|---|---|---|---|---|
| 4,787,051 A | * | 11/1988 | Olson | 345/179 |
| 2003/0210255 A1 | * | 11/2003 | Hiraki | 345/684 |
| 2004/0100441 A1 | * | 5/2004 | Rekimoto et al. | 345/158 |
| 2004/0201571 A1 | * | 10/2004 | Chen | 345/158 |
| 2004/0227725 A1 | | 11/2004 | Calarco et al. | |
| 2005/0073497 A1 | * | 4/2005 | Kim | 345/158 |
| 2005/0128180 A1 | * | 6/2005 | Wang | 345/156 |
| 2005/0162382 A1 | * | 7/2005 | Choi et al. | 345/156 |

FOREIGN PATENT DOCUMENTS

| | | |
|---|---|---|
| CN | 1484785 A | 3/2004 |
| CN | 1641707 A | 7/2005 |
| JP | 2001-175412 A | 6/2001 |
| JP | 2004-096548 A | 3/2004 |
| KR | 2003-0090089 A | 11/2003 |
| KR | 2004-0010011 A | 1/2004 |

* cited by examiner

*Primary Examiner* — Richard Hjerpe
*Assistant Examiner* — Andrew Schnirel
(74) *Attorney, Agent, or Firm* — Sughrue Mion, PLLC

(57) ABSTRACT

A remote control device is provided. The device includes an attitude sensing unit that senses the attitude of a device; an axis determining unit that determines one axis in space according to the attitude; a direction input unit that receives a selection command input of one of two directions that are parallel to the axis and are in opposite directions to each other; and a transmission unit that transmits a control signal to move a predetermined graphics object in a direction corresponding to the selection command.

16 Claims, 9 Drawing Sheets

DIRECTION-INPUT KEY(15)

METHOD OF CONTROLLING MOVEMENT OF GRAPHICS OBJECT AND REMOTE CONTROL DEVICE USING THE SAME

CROSS-REFERENCE TO RELATED APPLICATION

This application is based on and claims priority from Korean Patent Application No. 10-2006-0020011 filed on Mar. 2, 2006 in the Korean Intellectual Property Office, the disclosure of which is incorporated herein in its entirety by reference.

BACKGROUND OF THE INVENTION

1. Field of the Invention

Methods and apparatuses consistent with the present invention relate to a method of controlling movement of a graphics object, and a remote control device using the same. More particularly, the present invention relates to a method of controlling movement of a graphics object, and a remote control device using the same, which makes the attitude sensed by a predetermined sensor correspond to an axis in space, and moves a graphics object on the corresponding axis according to a command input through a predetermined input means.

2. Description of the Related Art

Use of the Internet has become widespread, and has significantly affected the entire digital industry. Internet-based services, and content distributed through the Internet are becoming a barometer of the digital industry of the 21st century. Moreover, as high-speed Internet, mobile phones, PDAs, laptop computers, and other similar devices and services become widespread, the demand for multimedia content is increasing.

A digital TV provides various functions, exempting analogue content-providing function. The digital TV provides many functions such as the reception of a digital TV signal, an electronic program guide (EPG), two-way communication, and access to the Internet. It may also play a role as a server in a ubiquitous environment. Recently, as Internet functions have been added, the Java Virtual Machine (JVM) and user interfaces (UI) based thereon have been developed and applied for Internet use. Digital broadcasting provides high definition, high sound quality, multiple channels, two-way connection, the Internet, and other services. The two-way connection transmits various multimedia information along with broadcasting, which makes interactive services possible.

Various applications are necessary for the spread of interactive TV services. Further, various dynamic multimedia applications can be developed by applying Java technology to the digital TV.

Conventional TV input methods have many limitations. It is difficult to fully utilize functions of a digital TV with a conventional remote control device having only simple functions such as a channel change, a volume adjustment, and others.

Especially, in order to use various functions in connection with the EPG, Internet, and digital-broadcasting reception, many menus need to be converted or modified. Further, a remote control device is usually used for the input as TVs are mainly controlled from a distance, and it is not easy to utilize a mouse of a computer or a touch screen of a PDA. Hence, there is a need for effectively using functions of a digital TV through the direction movement or the input of a certain button provided on a remote control device.

FIG. 1 illustrates an input device that includes a conventional direction input key. A remote control device includes a direction input key 15 that moves a cursor, a focus, or a screen. A jog shuttle controller 16, 17 performs functions similar to such movements. The jog shuttle 16, 17 receives directional inputs through a wheel. A digital device that adopts a remote control device, a key pad, or a jog shuttle, provides simple and convenient functions through such a direction input key.

Usability needs to be examined in using functions of a digital TV through such a direction input. There are roughly two types of usability, i.e., easy use and intuitive use.

"Easy use" refers to a user's ability to easily use a certain function with minimum inputs. When the function is performed through a direction input of the remote controller jog shuttle, many inputs need to be made, thereby impeding the convenience of using a digital TV. Accordingly, the key to facilitating the convenience is to provide as many functions as possible while reducing the number of inputs.

Further, "intuitive use" refers to the case where a certain function to be performed, or a result of a certain input, is the function or result naturally predicted by a user. For example, when a left-key of the jog shuttle is pressed while the menu is in display, the screen moves to the left or the left-menu is selected.

FIG. 2 illustrates a content selection or a menu movement according to a conventional method, and a plurality of menu items 20. Here, each menu item 20 can be an icon for the input of a certain function, or a thumbnail for multimedia content. That is, in order to make the device perform a certain process or display certain multimedia content, a user needs to select the menu.

The arrangement and the number of displayed menu items 20 vary depending on the situation, and as the number of menu items increases, so does the inconvenience of making a selection. For example, if the number of menu items is 10, the user can make a choice by less than 10 key inputs. However, if the number of menus is 100, the user must make his choice by performing more than ten key inputs. It is very difficult to perform more than ten key inputs using a remote control device.

Of course, the user can change between the menu items 20 using buttons on the right and left sides, and the upper and lower sides, but the operation will be different depending on the state of arrangement of buttons. Further, when selecting a certain menu using number buttons, the user needs to remember the number of the menu, which is inconvenient.

Korean Unexamined Patent 10-2004-0010011 discloses an apparatus that senses three-dimensional movements of a portable device having a small display area using an acceleration sensor, converts the sensed movements into screen-control signals, and moves the displayed screen. However, this patent does not disclose the selection of menus displayed on the screen. That is, according to the disclosed invention, menus can be effectively moved, but fine menu selection is difficult.

Hence, there is a need for a method that can make it easy for a user to select one of a plurality of displayed menu items.

SUMMARY OF THE INVENTION

An aspect of the present invention is to make an attitude sensed by a predetermined sensor correspond to an axis in space, and move a graphics object on the corresponding axis according to the command input through a predetermined input means.

The present invention is not limited to the technical aspects described above. Other aspects not described herein will be more definitely understood by those in the art from the following detailed description.

According to an exemplary embodiment of the present invention, a remote control device is described which includes an attitude sensing unit that senses the attitude of a device; an axis determining unit that determines one axis in space according to the attitude; a direction input unit that receives a selection command input of one of two directions that are parallel to the axis and are in opposite directions relative to each other; and a transmission unit that transmits a control signal to move a predetermined graphics object in a direction corresponding to the selection command.

According to a further exemplary embodiment of the present invention, a method of controlling movement of a graphics object is provided, the method including sensing the attitude of the graphics object itself; determining one axis in space according to the attitude; receiving a selection command input of one of two directions that are parallel to the axis and are in opposite directions relative to each other; and transmitting a control signal to move a predetermined graphics object in a direction corresponding to the selection command.

BRIEF DESCRIPTION OF THE DRAWINGS

The above and other features of the present invention will become apparent in a detailed description of exemplary embodiments thereof with reference to the attached drawings, in which.

DETAILED DESCRIPTION OF EXEMPLARY EMBODIMENTS

Figure 1:
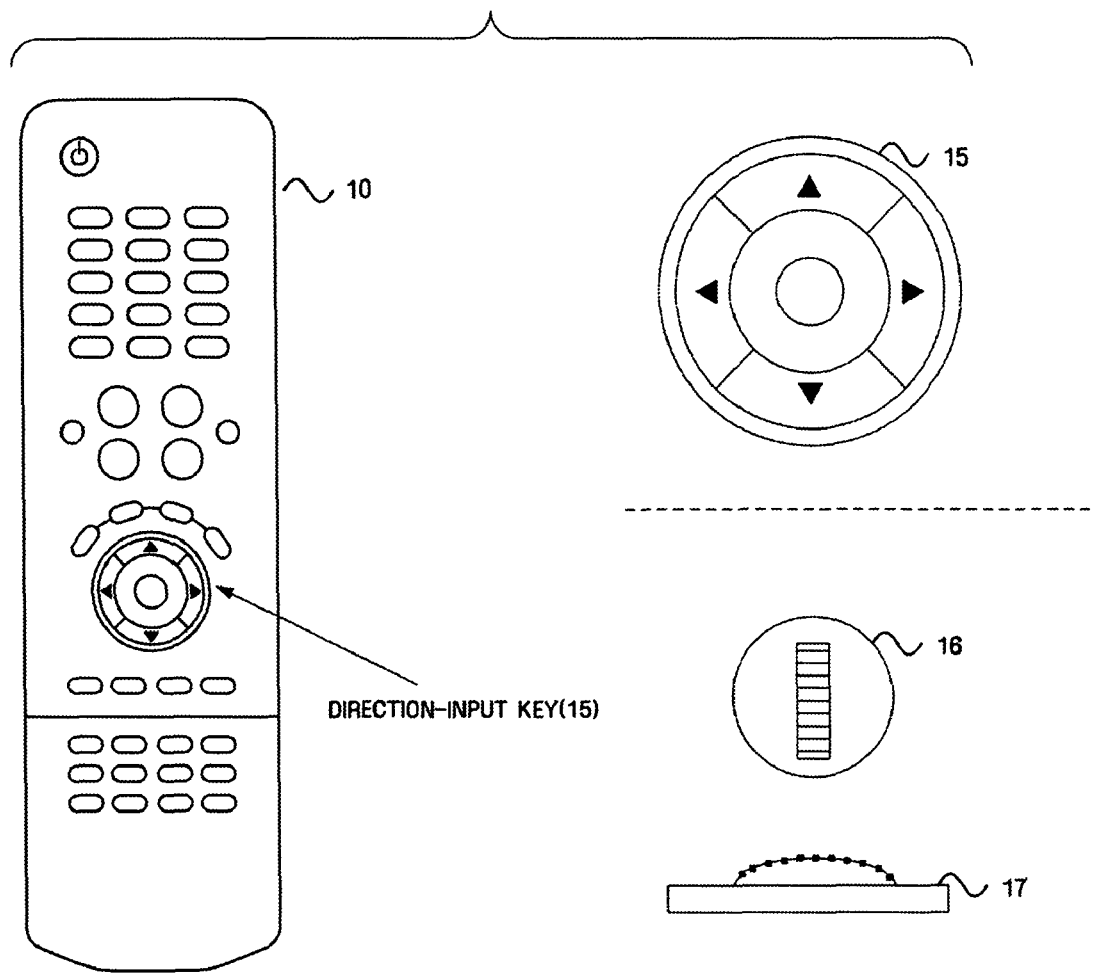
FIG. 1 illustrates an input device that includes a conventional direction input key.
Figure 2:
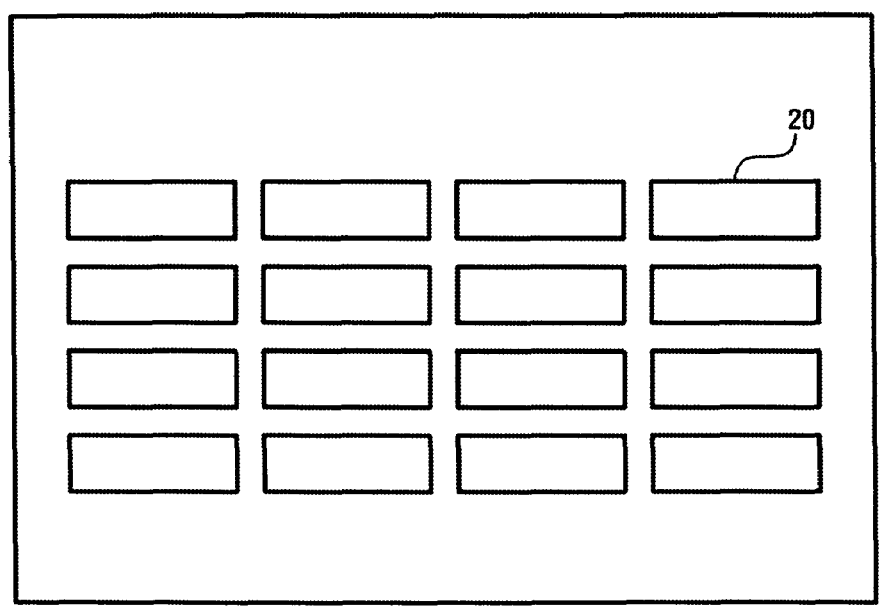
FIG. 2 illustrates a content selection or a menu movement according to a conventional method.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 3:
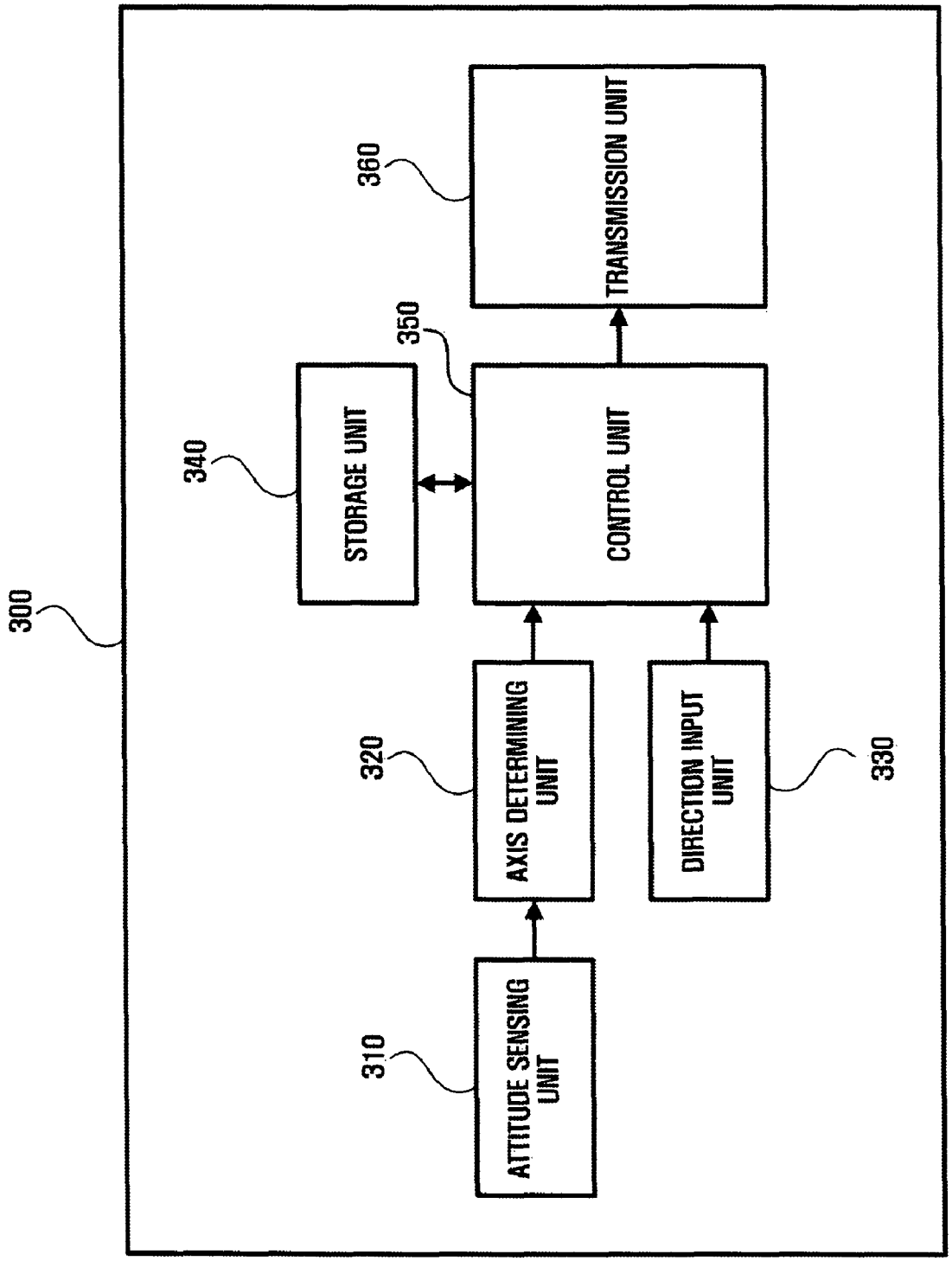
FIG. 3 is a block diagram illustrating a remote control device according to an exemplary embodiment of the present invention.

FIG. 3 is a block diagram illustrating a remote control device according to an exemplary embodiment of the present invention. The remote control device 300 includes an attitude sensing unit 310, an axis determining unit 320, a direction inputting unit 330, a storage unit 340, a control unit 350, and a transmission unit 360.

The attitude sensing unit 310 senses the attitude of the remote control device 300. Here, the attitude corresponds to three attitudes in space, and the direction of the axis is determined according to the attitude.

The attitude sensing unit 310 can sense the attitude using one or more gravity sensors, inertia sensors, terrestrial-magnetism sensors, or gyrosensors.

The axis determining unit 320 determines one axis in space according to the attitude sensed by the attitude sensing unit 310. For example, assuming that the three axes corresponding to right and left, up and down, and front and rear directions are x, y, and z, if the attitude of the remote control device 300 is parallel to right and left directions, the axis determining unit 320 determines the attitude of the remote control device 300 by the x-axis, and if the attitude of the remote control device 300 is parallel to up and down directions, the axis determining unit 320 determines the attitude of the remote control device 300 by the y-axis.

The axis determining unit 320 can determine one axis included in the critical range among three axes in space. That is, even though the attitude of the remote control device 300 is not exactly parallel to one of three axes in space, but slants slightly, if the range of slanting is within a predetermined range of one axis, the axis determining unit 320 determines this axis to be the axis of the remote control device 300.

Further, the axis determining unit 320 can determine one axis direction among six axis directions parallel to three axes in space. That is, there can be two attitudes of the remote control device in parallel to one axis, and the axis determining unit 320 determines not only one axis, but also the direction to which the remote control device 300 is directed on the axis.

The direction input unit 330 receives a selection command input of one of two axis directions that are parallel to the axis determined by the axis determining unit 320. Here, the direction input unit 330 can receive the selection command input using a button, a wheel, or a toggle switch.

For example, in the case where the direction input unit 330 consists of buttons, two buttons can correspond to two axis directions, respectively; in the case where the direction input unit 330 consists of a wheel, the rotary directions of the wheel can correspond to two axis directions; and in the case where the direction input unit 330 consists of a toggle switch, the selection directions of the toggle switch can correspond to two axis directions.

The direction input unit 330 will be described in more detail later with reference to FIGS. 7A to 7C.

The storage unit 340 stores a control signal to move a graphics object. That is, the control signal includes flags representing the movement direction of the graphics object such as flags of 1, 2, 3, 4, 5 and 6, corresponding to up, down, right, left, front, and rear directions. Further, the control signal can include a flag representing the movement speed. The storage unit 340 is a module to and from which information can be input and output, such as a hard disk, a compact flash card (CF card), a secure digital card (SD card), a smart media card (SM card), a multimedia card (MMC), or a memory stick. The storage unit 340 can be installed inside the remote control device 300, or can be installed in a separate device.

The control unit 350 extracts a control signal from the storage unit 340 to move a predetermined graphics object in the axis direction corresponding to the selection command, among axis directions determined by the axis determining unit 320. For example, in the case where the axis determined by the axis determining unit 320 is the x-axis, and the direction determined by the direction input unit 330 is the left direction, the control signal for the left direction is extracted from the storage unit 340. Here, according to the input command transmitted from the direction input unit 330, the movement speed of the graphics object is determined, and the control signal can be extracted.

Further, the control unit 350 performs the general control of the attitude sensing unit 310, the direction input unit 330, the storage unit 340, the axis determining unit 320, the transmission unit 320, and the remote control device 300.

The transmission unit 360 transmits a control signal extracted by a control unit 350. The transmitted control signal is transmitted to a device displaying a graphics object (hereinafter, called a "graphics object display device"). Some examples of communication methods between a transmission unit 360 and a graphics object display device are wire-communication methods such as Ethernet, USB, IEEE 1394, serial communication, and parallel communication, and wireless communication methods such as infrared communication, Bluetooth, home radio frequency (RF), and wireless LAN. Among these methods, the infrared communication method is preferable.

The graphics object display unit moves a graphics object according to the received control signal. Here, the graphics object display unit can control the movement speed of the graphics object using the movement speed included in the control signal. The movement of a graphics object will be described in more detail later with reference to FIG. 9.

Figure 4A:
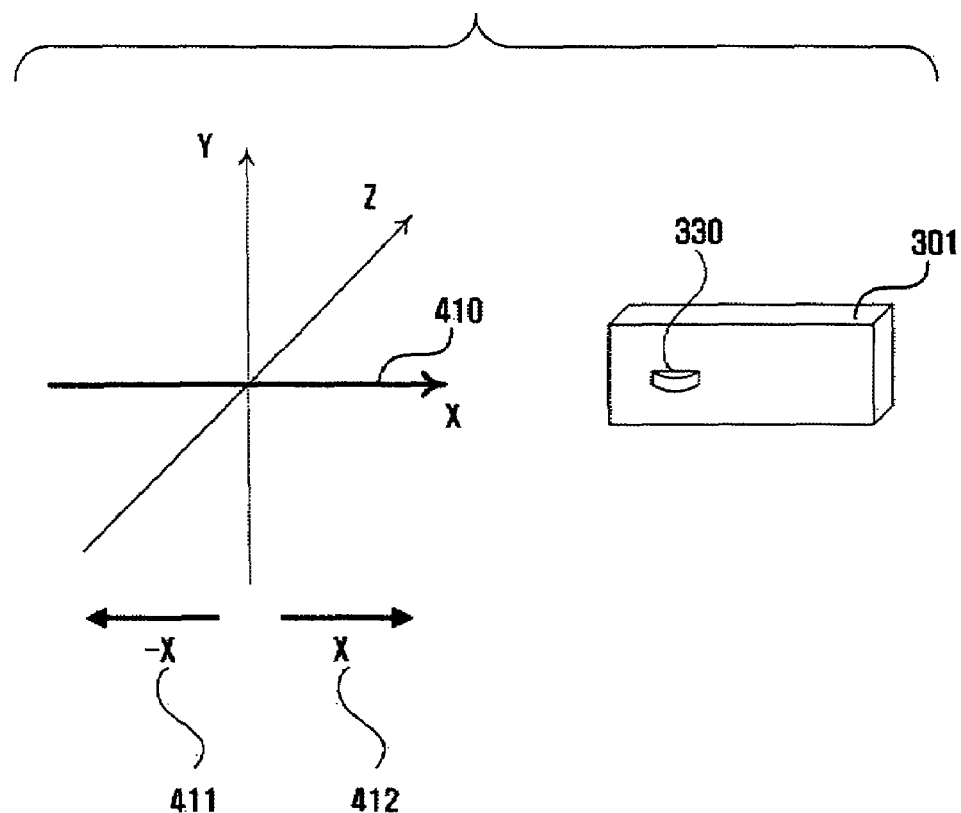
FIGS. 4A to 4C illustrate the concept of the attitude of a remote control device according to an exemplary embodiment of the present invention.
Figure 4B:
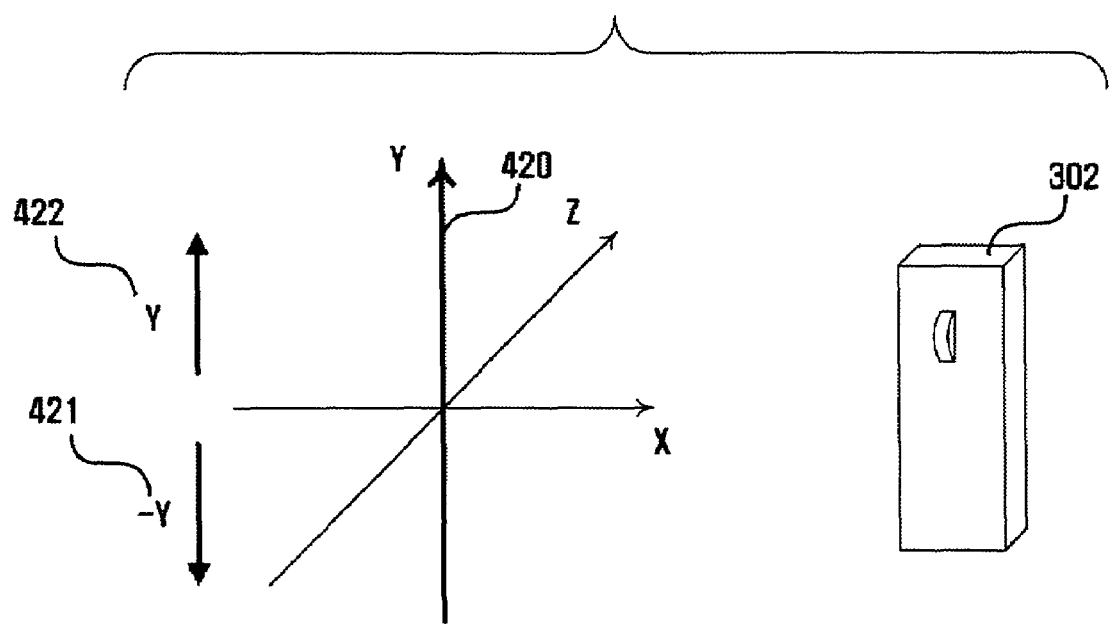
Figure 4C:
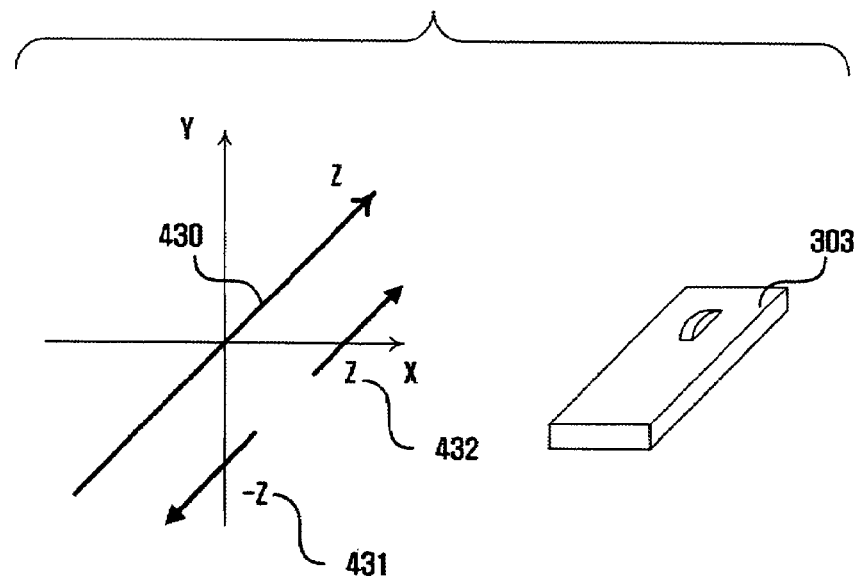

FIGS. 4A to 4C illustrate the concept of the attitude of a remote control device according to an exemplary embodiment of the present invention. The attitude of the remote control device 301 can be different depending on the manner in which a user holds the remote control device.

FIG. 4A illustrates the remote control device 301 parallel to x-axis 410, and a user holding the remote control device 301 with his right hand can make the attitude of the remote control device 301 parallel to the x-axis 410 by putting the back of his/her right hand upward. Here, the user can position the thumb of his/her right hand on the direction input unit 330, and the selection command of the direction input unit 330 can be input by a small movement of his/her thumb. For example, in the case where the direction input unit 330 consists of a wheel, the selection command in −x direction 411 can be input by rotating the wheel in the left direction, and the selection command in +x direction 412 can be input by rotating the wheel in the right direction.

FIG. 4B illustrates a remote control device 302 parallel to y-axis 420, and a user holding the remote control device 302 with his right hand can make the attitude of the remote control device 302 parallel to the y-axis 420 by putting the back of the right hand rightward. Here, the user can position the thumb of the right hand at the direction input unit 330, and the selection command of the direction input unit 330 can be input only with a little movement of the thumb. For example, in the case where the direction input unit 330 consists of a wheel, the selection command in y direction 422 can be input by rotating the wheel in up direction, and the selection command in the −y direction 421 can be input by rotating the wheel in the down direction.

FIG. 4C illustrates a remote control device 303 parallel to z-axis 430, and a user holding the remote control device 303 with his right hand can make the attitude of the remote control device 303 parallel to the z-axis 430 by bending the wrist of his/her right hand in the frontal direction. Here, the user can position the thumb of the right hand at the direction input unit 330, and the selection command of the direction input unit 330 can be input only with a little movement of the thumb. For example, in the case where the direction input unit 330 consists of a wheel, the selection command in +z direction 432 can be input by rotating the wheel in forward direction, and the selection command in −z direction 431 can be input by rotating the wheel in the rear direction.

Figure 5:
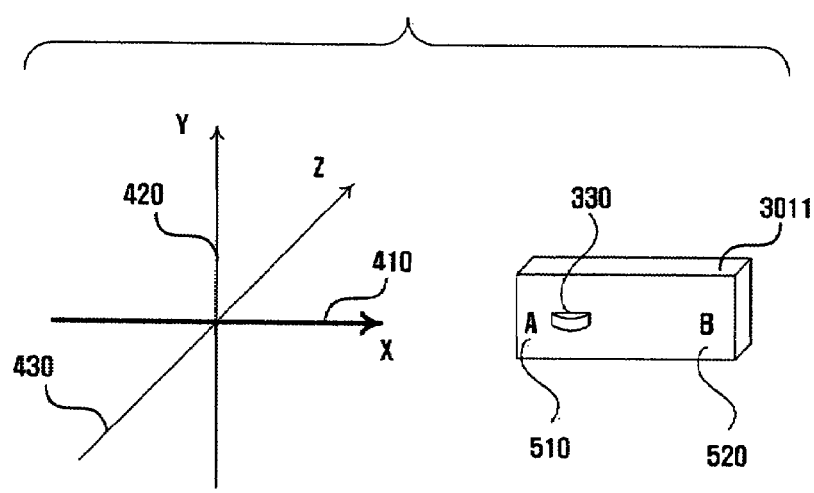
FIG. 5 illustrates the concept of the attitude of a remote control device according to another exemplary embodiment of the present invention.
Figure 5:
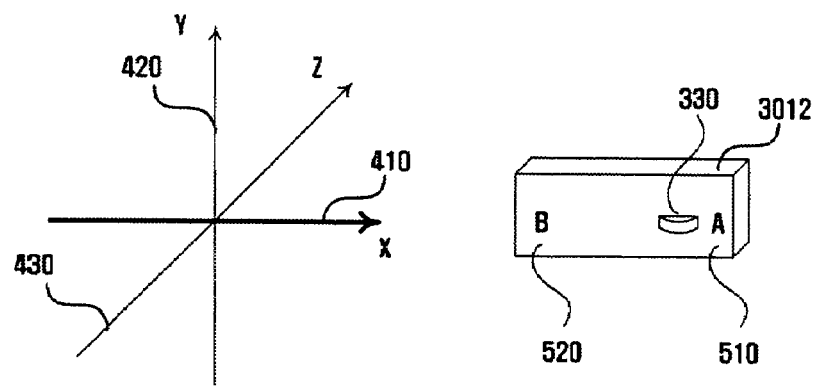

FIG. 5 illustrates the concept of the attitude of a remote control device according to another exemplary embodiment of the present invention, and the determination of one axis direction according to the attitude of the remote control device 3011 and 3012 among six axis directions parallel to three axes in space.

In the remote control device 3011, part A is directed toward the left side, and part B is directed toward the right side. As such, the attitude of the remote control device 3011 corresponds to the x-axis 410, and a graphics object moves in right and left directions (x-axis) according to the selection command that is input. That is, in the case where the direction input unit 330 is a wheel, if a user rotates the wheel from B 520 towards A 510, a left control signal is extracted, and if the user rotates the wheel from A 510 towards B 520, a right control signal is extracted.

Further, in the remote control device 3012, part B 520 is directed toward the left side, and part A 510 is directed toward the right side. Like the remote control device 3011, this remote control device 3012 is parallel to the x-axis 410. As such, the attitude of the remote control device 3012 corresponds to the x-axis 410, and the graphics object moves in right and left directions (x-axis) according to the selection command input through the direction input unit 330. However, since the attitude of the remote control signal 3012 is opposite to the attitude of the remote control signal 3011, their input directions are also opposite to each other. That is, in the case where the direction input unit 330 is a wheel, if a user rotates the wheel from B 520 towards A 510, a right-control signal is extracted, and if the user rotates the wheel from A 510 towards B 520, a left-control signal is extracted.

That is, though the axis determining unit 320 is parallel to the same axis, the axis determining unit 320 senses the direction of the remote control device 300. As such, a user who wants to move a graphics object may easily do so using not only the right hand but also the left hand, by inputting a selection command through the direction input unit 330.

The x-axis has been described with reference to FIG. 5, but the remote control direction can also be sensed by the axis determining unit 320 in the y-axis 420 and the z-axis 430.

Figure 6:
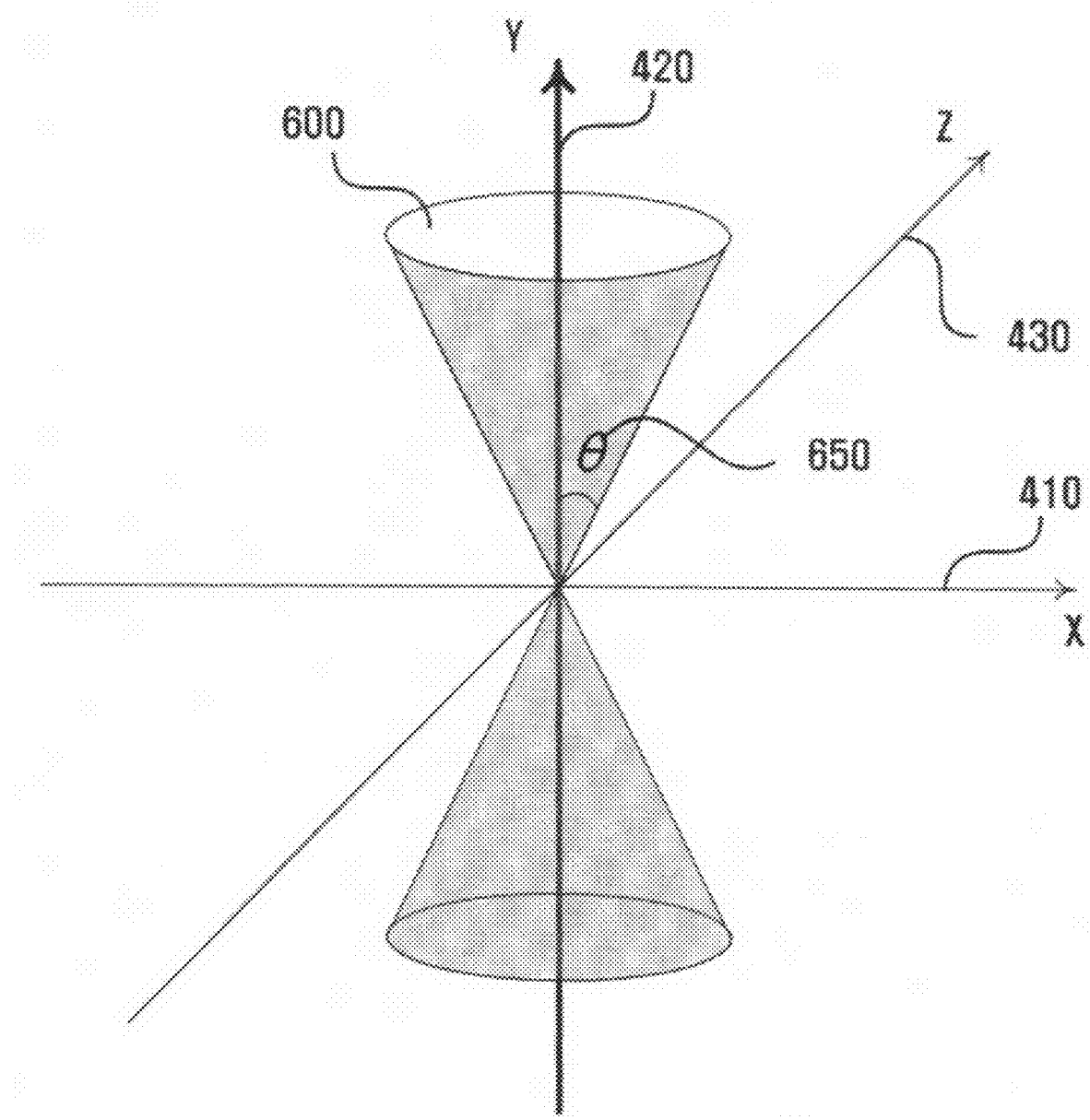
FIG. 6 illustrates the concept of a critical range for determining an axis in space according to an exemplary embodiment of the present invention.

FIG. 6 illustrates the concept of a critical range for determining an axis in space according to an exemplary embodiment of the present invention.

Since the attitude of a remote control device 300 is adjusted by a user, the attitude may not be exactly parallel to one axis in space. Hence, the axis determining unit 320 of the present invention determines that one axis among three axes, for which the attitude of the remote control device 300 is in the critical range, is parallel to the attitude of the remote control device 300.

FIG. 6 shows the critical range 600 of the y-axis 420. If the attitude of the remote control device 300 is included in the critical range 600, i.e., the angle 650 between the remote control device 300 and the y-axis 420 is within θ, the axis determining unit 320 determines that the attitude of the remote control unit 300 is parallel to the y-axis 420.

FIG. 6 illustrates only the critical range 600 of the y-axis 420, but the attitude of the remote control device 300 on the x-axis 410 and the z-axis 430 can also be determined. Further, the critical angle θ, which determines the critical range of each axis, can be set by the user, and the critical range may differ by axes, according to different critical angles set for different axes.

Figure 7A:
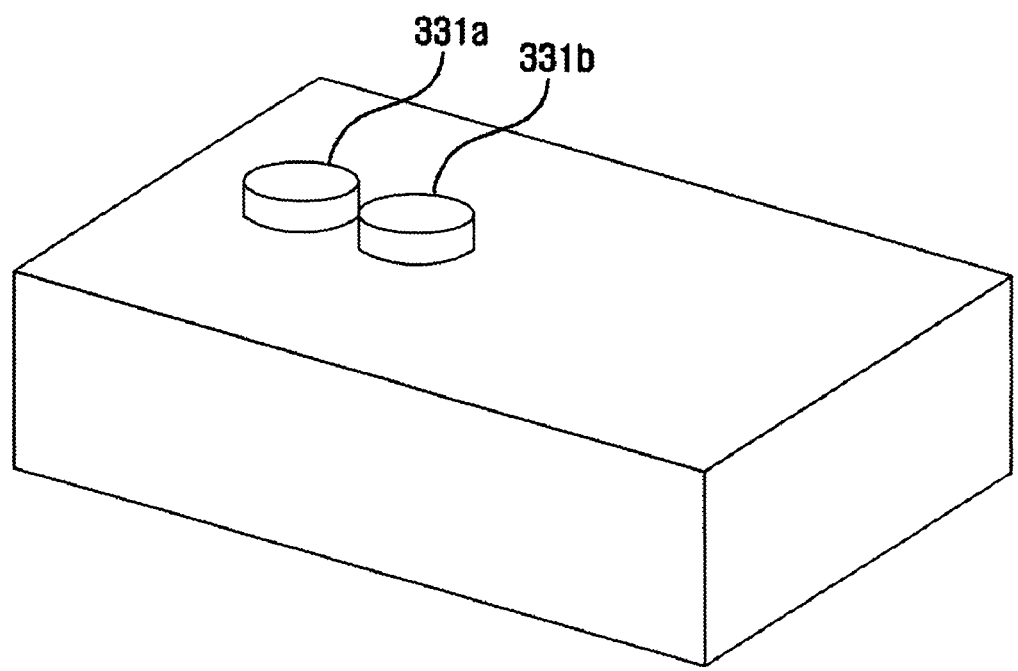
FIGS. 7A to 7C illustrate a direction input unit according to an exemplary embodiment of the present invention.
Figure 7B:
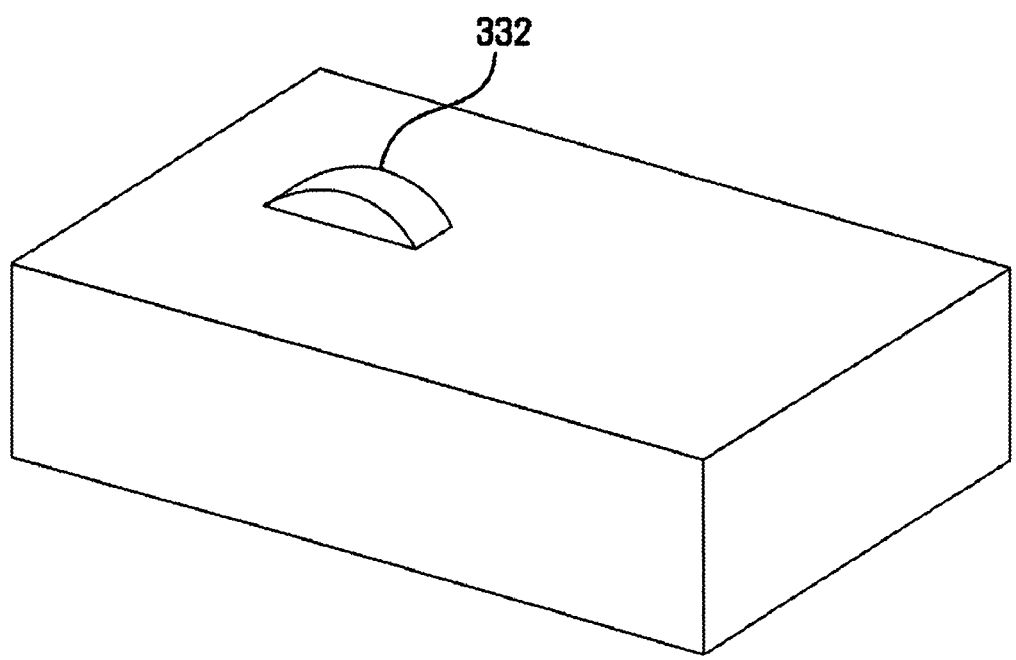
Figure 7C:
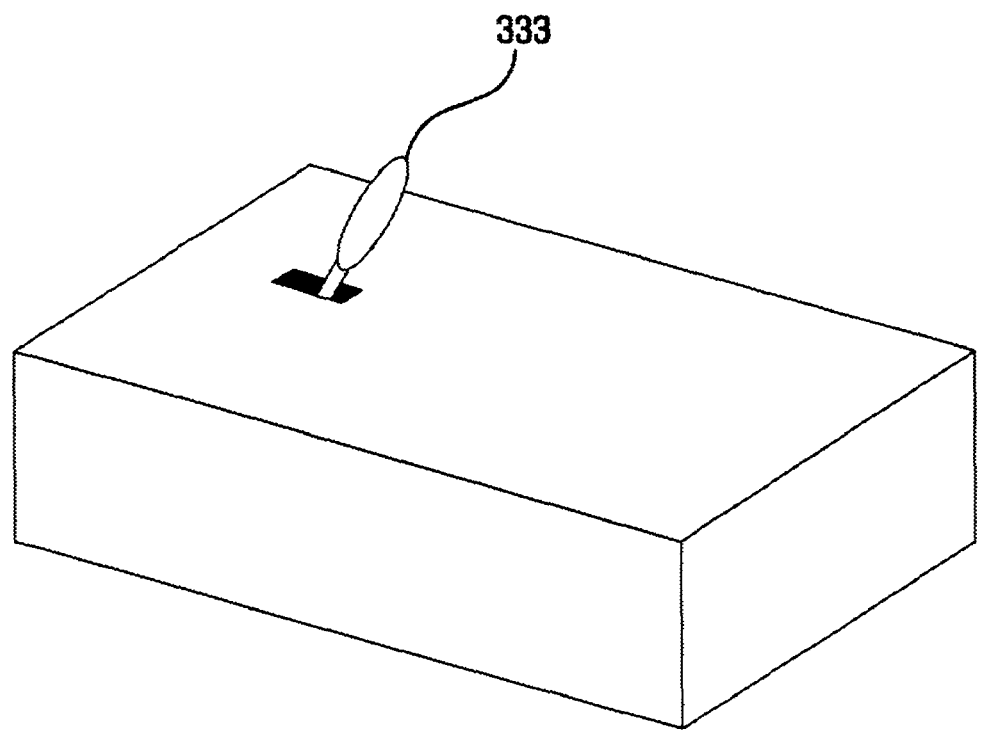

FIGS. 7A to 7C illustrate a direction input unit 330 according to an exemplary embodiment of the present invention, and FIG. 7A shows a direction input unit 330 consisting of buttons 331a and 331b. In the case where the direction input unit 330 consists of buttons 331a and 331b, the two buttons 331a and 331b can receive a selection command input. That is, the two buttons 331a and 331b determine the direction of the axis. For example, in the case where the attitude of the remote control device 300 is parallel to the x-axis, one 331a of the two buttons receives the selection command input to the −x direction, and another one 331b receives the selection command input to the +x direction.

Further, the user can set the movement speed of a graphics object using the buttons 331a and 331b; the number of clicks of buttons 331a and 331b within a predetermined time can correspond to the movement speed of the graphics object. For example, if a button 331a or 331b is clicked one time within the predetermined time, a normal speed control signal is extracted, and if a button 331a or 331b is clicked two times, a double speed control signal is extracted.

Further, in the case where the button 331a or 331b is kept pressed, it is possible that the movement speed of the graphics object is increased by steps according to the duration for which the button is pressed. For example, in the case where the duration of the clicked state of the button 331a or 331b is less than 2 seconds, a normal speed control signal is extracted, while in the case where the duration is between 2 and 5 seconds, a double speed control signal is extracted, and in the case where the duration is 5 to 10 seconds, a quadruple speed control signal is extracted.

FIG. 7B illustrates a direction input unit 330 consisting of a wheel 332. In the case where the direction input unit 330 consists of a wheel 332, the user can input a selection command by rotating the wheel 332. That is, there are two rotary directions of the wheel 332, and each direction corresponds to the axis direction of the axis parallel to the attitude of the graphics object. For example, in the case where the attitude of the remote control device 300 is parallel to the x-axis, one of two directions of the wheel 332 receives the selection command input in the −x direction, and another receives the selection command input in the +x direction.

Further, the user can set the movement speed of the graphics object using the wheel 332, and the rotary speed can correspond to the movement speed of the graphics object. For example, if a user rotates the wheel 322 at less than a certain speed, a normal speed control signal is extracted, and if the wheel 332 is rotated at more than a certain speed, a double speed or quadruple speed control signal is extracted.

FIG. 7C illustrates a direction input unit 330 consisting of a toggle switch 333. In the case where the input unit 330 is a toggle switch 333, the user can input a selection command by converting the direction of the toggle switch 333. That is, there are two directions of the toggle switch 333, and each direction corresponds to the axis direction of the axis parallel to the attitude of the graphics object. For example, in the case where the attitude of the remote control device 300 is parallel to the x-axis, one of two directions of the wheel 332 receives the selection command input in the −x direction, and another receives the selection command input in the +x direction.

Further, the user can set the movement speed of a graphics object using a toggle switch 333, and in the case where one direction of the toggle switch 333 is kept selected, it is possible that the movement speed of the graphics object is increased by steps according to the duration of the selected state. For example, in the case where the duration of the selected state of one side of the toggle switch 333 is less than 2 seconds, a normal speed control signal is extracted, while in the case where the duration is between 2 and 5 seconds, a double speed control signal is extracted, and in the case where the duration is 5 to 10 seconds, a quadruple speed control signal is extracted.

Further, the toggle switch 333 can be a momentary switch that selects to one direction, and then returns to the original position. As such, the user can conveniently select the direction of the toggle switch 333.

Figure 8:
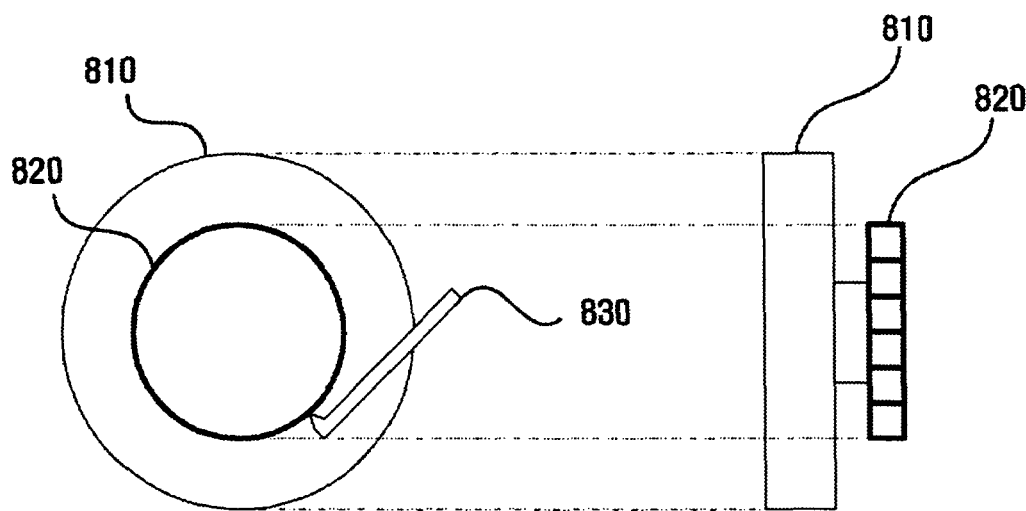
FIG. 8 illustrates the structure of a wheel according to an exemplary embodiment of the present invention.

FIG. 8 illustrates the structure of a wheel according to an exemplary embodiment of the present invention. The wheel 332 includes a rotation unit 810, a gear unit 820, and a fixing unit 830.

The cylindrical rotation unit 810 receives a rotation-command input from a user's finger in contact with the cylindrical rotation unit 810. A portion of the rotation unit 810 projects to the outside of the remote control device 300. The surface of the rotation unit 810 can increase friction with a user's finger using materials such as rubber.

The cylindrical gear unit 820 makes the rotation unit rotate by steps. That is, there are grooves at regular intervals around the cylinder. The grooves are in contact with the fixing unit 830, and induce the rotation unit to rotate by steps, preventing minute movements of the rotation unit when the rotation is terminated.

The fixing unit 830 is positioned in contact with the gear unit 820. The fixing unit 830 prevents minute or inadvertent movements of the rotation unit. A projecting part can be formed at the end of the fixing unit 830 where it contacts the gear unit 820, and as the projecting part is partially or fully inserted into a groove of the gear unit 820, the rotation may proceed by steps, and minute movements of the rotation unit are prevented. Further, an elastic means such as a spring can be used so that the projecting part of the fixing unit 830 is pressed against the surface of the gear unit 820.

Figure 9:
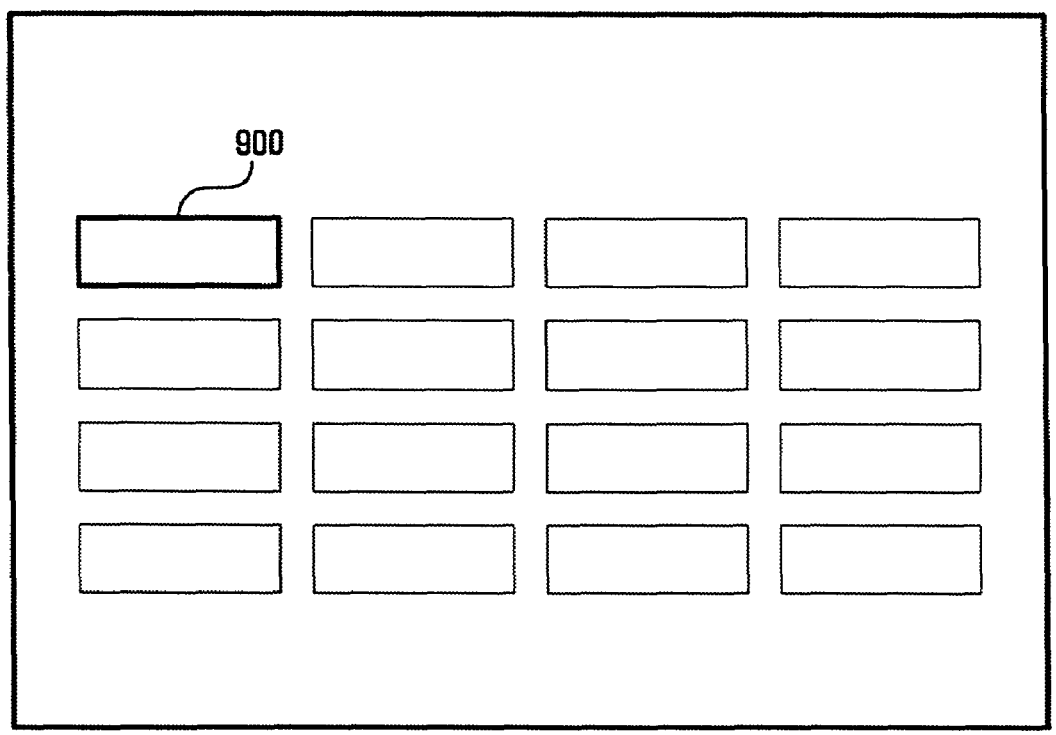
FIG. 9 illustrates movement of a graphics object according to an exemplary embodiment of the present invention.

FIG. 9 illustrates movement of a graphics object according to an exemplary embodiment of the present invention, and a cursor 900, which is a graphics object that moves on the screen of a display device, and indicates a menu item selected by a user in the state where a plurality of menus are arranged.

The cursor 900 moves up and down, or right and left, according to the control signal transmitted from the remote control device 300. In the case where menus are displayed in a three-dimensional form, the cursor 900 can also move in front and rear, i.e., forward and backward, directions.

The remote control device 300 can transmit a control signal that includes the movement speed of a graphics object, and thus the movement speed of the cursor 900 can be changed. For example, the cursor 900 moves across the menu by one menu item increments for a normal speed control signal, and the cursor 900 moves across the menu by one page increments for a double speed control signal. Here, a "page" refers to a screen on which a series of menu items are displayed at the same time. For example, if there are 64 menu items, and 16 menu items can be displayed on one screen, the first page is a screen where menu items 1 to 16 are included, the second page is a screen where menu items 17 to 32 are included, the third page is a screen where menu items 33 to 48 are included, and the fourth page is a screen where menu items 49 to 64 are included.

FIG. 9 shows the movement of a cursor by a control signal, but other functions may also be performed; for example, a graphics object such as a thumbnail can be moved, and full-screen multimedia content can be displayed. That is, if a user wants to retrieve a plurality of stored video files, each video file can be displayed through the display device, and the display device can extract and display stored video files according to the received control signal. For example, in the case where a series of video files are stored, a display device receiving a normal speed control signal extracts and displays video files stored after the currently displayed video file, and a display device receiving a double speed control signal extracts and displays video files after 10th file from the currently displayed video file.

Figure 10:
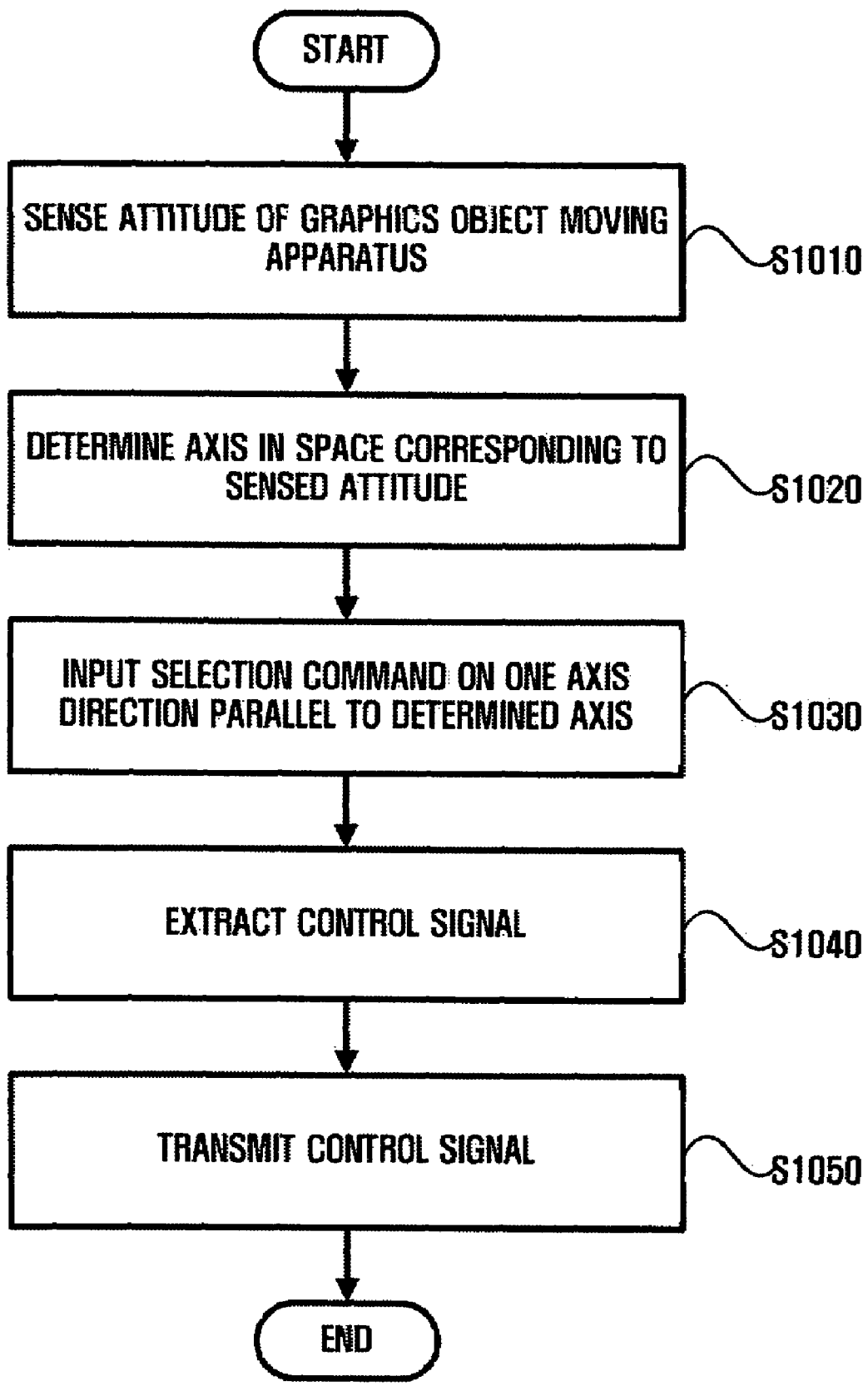
FIG. 10 is a flow chart illustrating a process of moving a graphics object according to an exemplary embodiment of the present invention.

FIG. 10 is a flow chart illustrating a process of moving a graphics object according to an exemplary embodiment of the present invention.

In order to move a graphics object, the attitude sensing unit 310 of the remote control device 300 senses the attitude of the remote control device 300. Here, the attitude corresponds to three axes in space, and the axis direction is determined according to the attitude.

The attitude sensing unit 310 can sense the attitude of the remote control device 300 using one or more gravity sensors, inertia sensors, terrestrial-magnetism sensors, or gyrosensors.

The sense attitude is transmitted to the axis determining unit 320, and the axis determining unit 320 determines one axis in space according to the transmitted attitude in S1020. That is, it is determined to which axis among the x-axis, y-axis, and z-axis the attitude of the remote control device 300 is parallel.

Here, the axis determining unit 320 can determine one axis using the attitude of the remote control device 300, which attitude is within one of the predetermined critical-angle ranges of the three axes in space. The critical ranges have been described in detail with reference to FIG. 6, and thus the description on the critical ranges is omitted here.

Further, the axis determining unit 320 can determine one axis direction according to the attitude of the remote control device among 6 axis directions parallel to 3 axes in space. As the axis direction is determined by the axis determining unit 320, the user can get the same result regardless of which hand is used to input a selection command, and the remote control device 300 can transmit the control signal according to the intention of the user.

In the state where one axis has been determined by the axis determining unit 320, the input unit 330 receives a selection command input on one of two axis directions parallel to the determined axis in S1030. Here, the direction input unit 330 can receive the selection command using a button, a wheel, or a toggle switch, and the direction input unit 330 can receive a selection command input regarding the movement speed of a graphics object as well as a selection command input regarding a direction determination.

The axis determined by the axis determining unit 320 and the selection command input by the direction input unit 330 are transmitted to the control unit 350, and the control unit 350 extracts the control signal to move a graphics object in the axis direction corresponding to the selection command from the storage unit 340, in S1040. For example, in the case where the axis determined by the axis determining unit 320 is the x-axis, and the selection command input through the direction input unit 330 is the command for the left side, the control unit 350 extracts the control signal for the left direction from the storage unit, and if the selection command for the movement speed of the graphics object is included, the control unit 350 extracts the control signal that includes the movement speed.

The extracted control signal is transmitted to the transmission unit 360, and the transmission unit 360 transmits the control signal to the display device using a predetermined communication method in S1050.

Further, the display device, which receives the control signal, moves the graphics object in the direction and at the speed included in the control signal.

It should be understood by those of ordinary skill in the art that various replacements, modifications and changes may be made in the form and details, without departing from the spirit and scope of the present invention as defined by the claims. Therefore, it is to be appreciated that the above described embodiments are for purposes of illustration only and are not to be construed as limitations of the invention.

The method and apparatus of the present invention has certain advantages, not exhaustively listed here, which include the following advantages.

First, making an attitude sensed by a predetermined sensor correspond to an axis in space, and moving a graphics object on the axis corresponded according to the command inputted by a predetermined input means, allows a user to easily select a desired object.

Second, the number of buttons included in the apparatus can be reduced.

What is claimed is:

1. A remote control device comprising:
    an orientation sensing unit that senses an orientation of a device in a three-dimensional space;
    an axis determining unit that determines which axis from among three axes in the three-dimensional space with which the device is most parallel according to the orientation of the device in the three-dimensional space;
    a direction input unit that receives a selection command input of one of two directions that are parallel to the axis with which the device is most parallel and are in opposite directions; and
    a transmission unit that transmits a control signal to move a predetermined graphics object in a direction corresponding to the selection command along the determined axis,
    wherein the axis determining unit determines the axis with which the device is most parallel according to whether the orientation is within a critical range among critical ranges of three spatial axes; and
    wherein if the determining unit determines that a first axis of the three axes in the three-dimensional space is most parallel with the device, the control signal causes the predetermined graphics object to move along the first axis, and if the determining unit determines that a second axis of the three axes in the three-dimensional space is most parallel with the device, the control signal causes the predetermined graphics object to move along the second axis.

2. The device of claim 1, wherein the orientation sensing unit senses the orientation using at least one of a gravity sensor, an inertia sensor, a terrestrial magnetism sensor, and a gyrosensor.

3. The device of claim 1, wherein the axis determining unit determines an axis direction according to the orientation among six axis directions parallel to the three axes in the three-dimensional space.

4. The device of claim 3, wherein the control signal is extracted based on the axis direction and the selection command input.

5. The device of claim 1, wherein the direction input unit receives the selection command input using at least one of a button, a wheel, and a toggle switch.

6. The device of claim 5, wherein the control signal changes the movement speed of the graphics object according to the number of clicks of the button, the rotary speed of the wheel, or the duration of a direction selection of the toggle switch.

7. The device of claim 1, further comprising a storage unit that stores the control signal.

8. A method of controlling movement of a graphics object, the method comprising:
- sensing an orientation of the graphics object in a three-dimensional space;
- determining which axis from among three axes in the three-dimensional space with which the device is most parallel according to the orientation of the device in the three-dimensional space;
- receiving a selection command input of one of two directions that are parallel to the axis with which the device is most parallel and are in opposite directions; and
- transmitting a control signal to move a graphics object in the one of two directions corresponding to the selection command along the determined axis,
- wherein the determining the axis with which the device is most parallel comprises determining whether the orientation is within a critical range among critical ranges of three spatial axes; and
- wherein if a first axis of the three axes in the three-dimensional space is determined to be most parallel with the device, the control signal causes the graphics object to move along the first axis, and if a second axis of the three axes in the three-dimensional space is determined to be most parallel with the device, the control signal causes the graphics object to move along the second axis.

9. The method of claim 8, wherein the sensing comprises sensing the orientation using at least one of a gravity sensor, an inertia sensor, a terrestrial-magnetism sensor, and a gyrosensor.

10. The method of claim 8, wherein the determining comprises determining an axis direction according to the orientation among six axis directions parallel to three spatial axes.

11. The method of claim 10, wherein the control signal is extracted based on the axis direction and the selection command.

12. The method of claim 8, wherein the receiving comprises receiving the selection command input using at least one of a button, a wheel, and a toggle switch.

13. The method of claim 12, wherein the control signal changes movement speed of the graphics object according to at least one of number of clicks of the button, rotary speed of the wheel, and duration of a certain direction selection of the toggle switch.

14. The method of claim 8, further comprising storing the control signal.

15. The device of claim 1, wherein the axis determining unit determines the axis with which the device is most parallel to be parallel to a longitudinal axis of the input device, and the transmission unit transmits the control signal to move the predetermined graphics object in the direction parallel to the longitudinal axis of the input device.

16. The method of claim 8, wherein the determining the axis with which the device is most parallel comprises determining the axis to be parallel to a longitudinal axis of the input device, and the transmitting comprises transmitting the control signal to move the graphics object in the one of two directions parallel to the longitudinal axis of the input device.

* * * * *